United States Patent
Styron et al.

[11] Patent Number: 6,139,960
[45] Date of Patent: Oct. 31, 2000

[54] METHOD OF MAKING A MINERAL FILLER FROM FLY ASH

[75] Inventors: Robert William Styron, Marietta; Kamal Seyi Abiodun, College Park, both of Ga.

[73] Assignee: Mineral Resource Technologies, LLC, Atlanta, Ga.

[21] Appl. No.: 09/251,515

[22] Filed: Feb. 17, 1999

[51] Int. Cl.[7] ................................ B32B 5/16; B03B 1/02; C04B 14/04; C09C 1/28

[52] U.S. Cl. .......................... 428/402; 106/405; 106/461; 106/466; 106/481; 106/483; 106/484; 106/DIG. 1; 209/2; 209/11; 428/403

[58] Field of Search ..................... 106/405, 461, 106/466, 481, 483, 484, DIG. 4; 209/2, 11; 428/402, 403

[56] References Cited

U.S. PATENT DOCUMENTS

| | | | |
|---|---|---|---|
| 3,769,053 | 10/1973 | Pennachetti et al. | 106/288 B |
| 3,769,054 | 10/1973 | Pennachetti et al. | 106/288 B |
| 3,991,005 | 11/1976 | Wallace | 260/38 |
| 4,013,616 | 3/1977 | Wallace | 260/42.46 |
| 4,121,945 | 10/1978 | Hurst et al. | 106/288 B |
| 4,294,750 | 10/1981 | Klingaman et al. | 260/40 R |
| 4,486,211 | 12/1984 | Monaghan | 65/4.4 |
| 4,661,533 | 4/1987 | Stobby | 521/122 |
| 4,705,409 | 11/1987 | Trerice | 374/45 |
| 4,992,102 | 2/1991 | Barbour | 106/645 |
| 5,087,545 | 2/1992 | Hagenbach | 430/137 |
| 5,160,539 | 11/1992 | Cochran | 106/405 |
| 5,299,692 | 4/1994 | Nelson et al. | 209/2 |
| 5,302,634 | 4/1994 | Mushovic | 523/219 |
| 5,391,417 | 2/1995 | Pike | 28/143 |
| 5,399,194 | 3/1995 | Cochran et al. | 106/405 |
| 5,536,310 | 7/1996 | Brook et al. | 106/708 |
| 5,565,239 | 10/1996 | Pike | 427/180 |
| 5,776,244 | 7/1998 | Ahrens | 106/737 |
| 5,814,256 | 9/1998 | Greve et al. | 264/86 |
| 5,817,230 | 10/1998 | Groppo et al. | 209/166 |
| 5,887,724 | 3/1999 | Weyand et al. | 209/2 |
| 5,935,885 | 8/1999 | Hnat et al. | 501/1 |

FOREIGN PATENT DOCUMENTS

| | | |
|---|---|---|
| 0 103 175 | 3/1984 | European Pat. Off. . |
| 292 008 | 7/1991 | Germany . |

OTHER PUBLICATIONS

Huang et al., "Processed Low $NO^x$ Fly Ash as a Filler in Plastics", Proceedings of Twelfth International Symposium on Management & Use of Coal Combustion Byproducts (CCBs), Jan. 26–30, 1997, Orlando, Florida, USA.

(List continued on next page.)

*Primary Examiner*—H. Thi Le
*Attorney, Agent, or Firm*—Killworth, Gottman, Hagan & Schaeff, LLP

[57] ABSTRACT

A method for producing a mineral filler from fly ash is provided in which fly ash is dry processed in an air classifier to obtain a fine fraction having an average particle size of from about 0.1 to 5 microns. The fine fraction is then preferably passed through a magnetic separator to remove ferrous iron oxides and may optionally be treated with a surface modifier. The resulting processed fly ash may be used in a wide variety of filler applications.

16 Claims, 1 Drawing Sheet

OTHER PUBLICATIONS

Advertisement for "Quality Polyolefine Pipes demand quality Packaging!" Modern Plastics International, Oct. 1986, p. 19.

Yih et al., "Recovery of Cenospheres and Application to the Manufacture of Insulation Materials" Journal of the chin. I. Ch. E., vol. 19, No. 1, 1988, pp. 23–29.

G. Dinelli, "Thermal By–Products Treatment and Valorization" Chemicke Listy, vol. 89, No. 3, Mar. 1995, pp. 137–143.

"Fly ash shows promise as plastics filler" C&EN, May 8, 1978, pp. 29–300.

Roger L. Kaas, "Residual Fly Ash Can Replace Talc and Kaolin as Polypropylene Filler " Plastics Design & Processing, Nov. 1978, pp. 49–53.

G.J. Jablonski, "Fly Ash Utilization as an Extender in Plastics and Paints" International Ash Utilization Symposium, Oct. 1987, pp. 38.1–38.15.

Berry, et al., "investigation of some new spherical fillers", *Plastics Compounding,* Nov./Dec. 1986, pp. 12–22.

Kaas, Roger L., "Fly Ash Filled Polypropylene", Abstract from Polymers Dept., General Motors Research Laboratories, Warren MI, pp. 266–269—Nov. 1978.

Curtis, et al.; "Coal Ash as an Alternative Filler and Colorant in Plastics", ANTEC '95, pp. 3594–3598, 1995.

Gerasimova, et al. "Pigments and Fillers Prepared from the Ash of Thermal Power Plants", *Russian Journal of Applied Chemistry,* vol. 71, No. 5, 1998, pp. 771–774.

Yang and Hlavacek, "Improvement of PVC wearability by addition of additives", *Powder Technology,* 1999, pp. 182–188.

Sole and Ball, On the abrasive wear behaviour of mineral filled polypropylene, from Triboloogy International, vol. 29, No. 6, 1996, pp. 457–465.

Jarvela et al., "Multicomponent compounding of polypropylene", Article from publication ©1996 Chappman & Hall, pp. 3853–3860.

Wong & Truss, "Effect of Flyash Content and Coupling Agent on the Mechanical Properties of Flyash–Filled Polypropylene", *Composites Science & Technology,* 1994, pp. 361–368.

Article entitled "Research News", *Journal of Protective Coatings & Linings,* Jun. 1988, pp. 4–9.

Perkov, A. N., "Production of Filler for Manufacture of Industrial Rubber Products from Thermal–Power Plant Ash", Khimya Tverdogo Topliva, vol. 26, No. 6, 1992, pp. 80–86.

Pashchenko, et al., "Fly Ash of heat and electric power plants and ferrochromium slag as fillers for plastics" (Abstract); *Plastics Manufacture & Processing,* 1984.

Abstract: Khytsnar, Y., et al.; "Fly Ash: A Filler for Plastics", Publication Date: 1987, p. 42–43.

Chamberlain et al., "The Viability of Using Fly Ash as a Polymer Filler", ANTEC '98, pp. 3415–3417, 1998.

METHOD OF MAKING A MINERAL FILLER FROM FLY ASH

BACKGROUND OF THE INVENTION

This invention relates to a method of making an industrial mineral filler from fly ash, and more particularly, it relates to a method in which raw fly ash is dry processed into fine fractions which can be utilized as a filler product.

Fly ash is a by-product derived from the combustion of coal and comprises finely divided inorganic products. Enormous amounts of fly ash are produced annually nationwide, primarily from burning coal in electric power plants. Disposal of fly ash has posed an increasingly difficult problem because the volume, the particulate nature, and the varied chemical composition of fly ash limit the number of acceptable disposal sites.

Accordingly, efforts have been made to find alternative, economic uses for fly ash. For example, fly ash has been used as an additive in portland cement. However, the fraction of fly ash which is suitable for use in concrete represents only a small portion of the total fly ash available. It would be desirable to find other uses for the fly ash material.

One such potential use for fly ash is as an industrial mineral filler. Mineral fillers are widely used in plastic products to improve performance and reduce costs. Mineral fillers commonly used for applications such as plastics, compounding, injection molding, paper products and the like include calcium carbonate, kaolin, aluminum hydrate, mica, talc and ground silica. Titanium oxide is also currently in wide use as a commercial filler, but is very expensive. The chemistry and characteristics of fly ash are close to those of such commercial fillers and would be a desirable substitute. However, the particle size of fly ash is much larger than that of typical commercial fillers. Wet processing such as wet milling, froth flotation, attrition grinding, and wet magnetic iron removal have been used in the past to reduce and control the particle size of fly ash. However, such methods are complicated, expensive, and require a multi-step process as the wet fly ash must be oven dried. In addition, methods such as froth flotation utilize reagents such as turpentine which must be safely disposed of.

Accordingly, there is still a need in the art for a method of producing mineral filler from fly ash which is economical, easy to implement, and which produces a usable particle size distribution.

SUMMARY OF THE INVENTION

The present invention meets that need by providing a method of processing fly ash into mineral filler which utilizes a dry method of processing, i.e., the method does not require or involve wetting, drying, or rewetting of the fly ash during processing. The resulting filler has an average particle size of from about 0.1 to 5 microns and may be used in a number of filler applications including plastics, paint, rubber, putty insecticides, textile coatings, putty, sealants, paper, calking, rubber, asphalt, and tiles.

In accordance with one aspect of the invention, a method for producing mineral filler from fly ash is provided comprising the steps of providing a quantity of raw fly ash having a carbon content of not more than 1% by weight, and passing the fly ash through an air classifier to obtain from about 0.1% to about 65% by weight of a fine fraction having an average particle size of from about 0.1 to about 5 microns. The method preferably includes the step of passing the fine fraction obtained through a magnetic separator to remove from about 0.1–99% by weight ferrous iron oxide from the fine fraction.

Preferably, the method further includes the step of treating or coating the filler with a surface modifier such as a surfactant, coupling agent, lubricant, or acid scavenger. The surface modifier is preferably selected from the group consisting of silanes, stearates, aluminate, titanate, and zirconate. A preferred silane is vinyl-amino methoxyl siloxane. A preferred stearate is calcium stearate. A preferred titanate is amino titanate. The surface modifier is preferably applied at a dry coating weight of between about 0.1 to 5% by weight.

The resulting filler may be used in a number of filler or extender applications as well as in composites. Specific uses for the fillers include thermoplastic compounding of polypropylene, low and high density polyethylene molds and extrusions, and in thermosetting bulk mold compounding and reinforced injection molding of unsaturated polyesters and polystyrenes. The filler may also be used in the thermoforming compounding of rigid or flexible polyvinyl chloride.

Accordingly, it is a feature of the present invention to provide a method for forming mineral filler from fly ash. Other features and advantages of the invention will be apparent from the following description, the accompanying drawings, and the appended claims.

DETAILED DESCRIPTION OF THE PREFERRED EMBODIMENT

Figure 1:
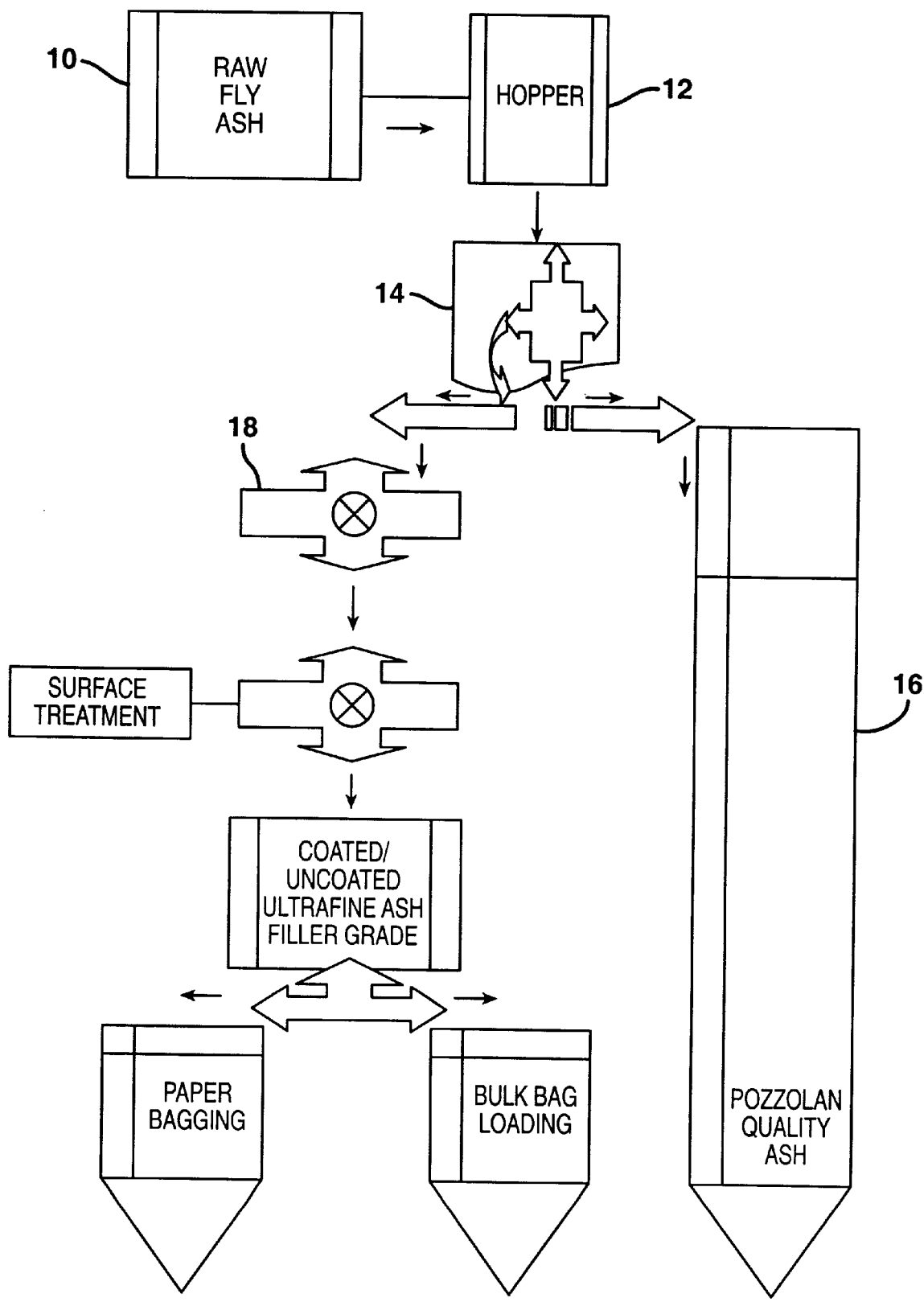
FIG. 1 is a flow diagram illustrating the method of making the filler of the present invention.

The present invention provides several advantages over previous processes in that it utilizes a dry processing method which does not require wetting and drying of the fly ash, and thus requires fewer steps and is more economical. The process is applicable to both Class C and Class F fly ash, which have an average particle size of about 10 to 15 microns.

Referring now to FIG. 1, the method of the present invention is illustrated. As shown, the raw fly ash 10 is fed into a hopper 12 and then through an air classifier 14 which separates the fly ash into a fine fraction having a particle size of from about 0.1 to about 5 microns. A preferred air classifier for use in the present invention is a Raymond® High Performance Jet-Stream™ Classifier available from ABB Raymond. Also suitable for use is a Raymond® mechanical air separator.

The coarse fraction of the fly ash that is generated from the air classifier is preferably diverted to a silo 16 where it may be used as pozzolan quality ash for use in cement applications. Because the coarse fraction is separated in this manner, only the fine fraction is processed further, not the total fly ash.

After passing through the air classifier, the fine fraction is preferably passed through a magnetic separator 18 to remove from about 0.1 to 99% by weight ferrous iron oxides, or magnetic iron, from the fine fractions. Suitable magnetic separators suitable for use include the Permroll® Magnetic Separator available from OSNA Equipment Inc., and Carpco and Ereiz Magnetic Units, available from Ereiz Magnets Inc. Preferred separators include an NHI (Neodymium-Iron-Boron) magnet, available from Bunting Magnetics Co. and a magnetic separator available from Walker Magnetics.

After removal of ferrous iron oxides, the filler is preferably treated with a surface modifier, such as an acid scavenger, surfactant, coupling agent, or lubricant to allow for higher loading and better coupling with polymers with little or no viscosity change. Such surface modifiers function to enhance the bond between the filler and the polymer or other medium in which the filler used. Suitable surface modifiers or coating agents include silanes, stearates, aluminates, titanates, and zirconates. Preferred surface modifiers are silanes and stearates, which may be used in aqueous, solid, or pre-hydrolyzed forms. A preferred silane is vinyl-amino methoxyl siloxane, which is a 40% solids solution of silane in methanol solvent available from Dow Corning. The silane is preferably surface coated as an aqueous solution on the filler particles using conventional spraying equipment. A preferred stearate is calcium stearate regular which is available from Witco Corporation in solid form. The stearate may be applied by several methods. For example, the filler may be dissolved with calcium stearate in water and then oven dried. Alternatively, the calcium stearate may be applied as a surface treatment while milling with the filler. The preferred method is to spray the calcium stearate on the filler while flowing the filler through a pug mill mixer or a paddle mill mixer.

The surface modifier may be applied to the filler prior to or during compounding with the polymer or other medium. The treated filler may then be bagged or otherwise packaged for shipment to a customer. The filler may also be mixed with water (slurried) for tank shipment for use in paint and paper applications.

The typical chemical composition of the filler includes from about 5–60% by weight aluminum oxide, about 0.5–60% by weight calcium oxide, about 5–30% by weight silicon oxide, about 0.5–15% by weight magnesium oxide and about 0.1–10% by weight titarium dioxide. More preferably, the chemical composition includes about 25–45% by weight aluminum oxide, about 30–40% calcium oxide, about 15–25% silicon oxide, about 0.5–10% magnesium oxide, and about 0.1–5% titanium dioxide.

The filler is comprised of spherical particles which allows better throughput and compounding when used. The filler also coats and tints easily and disperses uniformly. The filler has an oil absorption of about 22/100 according to ASTM D281, and a specific heat of 0.24 according to ASTM 4611. The filler exhibits a pH in water of from about 6–8 (ASTM 4972), thermal stability at temperatures up to about 1000–2500° F., a specific gravity of about 2.5–3.1 and Mohs hardness of about 3–5.5.

In order that the invention may be more readily understood, reference is made to the following examples which are intended to illustrate the invention, but not limit the scope thereof.

EXAMPLE 1

Two tons of Class C fly ash having a carbon content of less than 1% were separated using ABB Raymond's mechanical air separator and Jet stream classifier. RPMs of the separators were regulated to different speeds. The separated fine fraction was then passed through an NHI magnetic separator.

Table 1 below illustrates the analysis of the fines production.

TABLE 1

|  | 10% Recovery | 20% Recovery | 34% Recovery |
|---|---|---|---|
| Top Cut particle size | 5 μ | 7 μ | 10 μ |
| Avg. Particle Size | 1 μ | 1.4 μ | 2 μ |
| Color | Off white | Light tan | Light tan |
| Specific gravity | 3.109 | 3.04 | 3.02 |
| $Fe_2O_3$ (ferrous) content | 0.21% | 0.21% | 0.21% |

EXAMPLE 2

Four samples of raw fly ash, A, B, C and D were provided. Samples A and B comprised raw fly ash which was separated by air classification and formed into a filler according to the method of the present invention while sample C comprised intermediate fly ash (i.e., fly ash which underwent less RPM classification than samples A and B) and sample D comprised untreated raw fly ash. Table 2 below illustrates the principal constituents (by weight percent) of samples A, B and C versus sample D.

The samples were analyzed by X-ray diffraction using a Siemens D 500 X-ray diffractometer (XRD). The analysis revealed detection of primarily calcium oxide derivations in samples A, B, and C while silicon dioxide and tricalcium aluminate were the primary components of sample D. This illustrates that the coarser $SiO_2$ particles are separated via the classification process of the present invention and thus a calcitic product is formed.

TABLE 2

| Oxide | Sample A Filler Grade 1 micron | Sample B Filler Grade 2 microns | Sample C Intermediate 4 microns | Sample D Raw 10 microns |
|---|---|---|---|---|
| $Na_2O$ | 3.04 | 0.92 | 0.57 | 0.44 |
| MgO | 1.19 | 1.76 | 2.00 | 1.82 |
| $Al_2O_3$ | 17.33 | 17.99 | 17.10 | 15.89 |
| $SiO_2$ | 18.07 | 21.81 | 26.85 | 33.72 |
| $P_2O_5$ | 2.12 | 1.64 | 1.28 | 1.06 |
| $SO_3$ | 4.43 | 3.51 | 2.77 | 2.27 |
| $K_2O$ | 0.17 | 0.25 | 0.27 | 0.27 |
| CaO | 36.87 | 34.31 | 32.05 | 28.77 |
| $TiO_2$ | 0.99 | 1.10 | 1.10 | 1.07 |
| $Cr_2O_3$ | 0.02 | 0.02 | 0.02 | 0.02 |
| $Fe_2O_3$ | 5.19 | 5.93 | 5.98 | 5.98 |
| ZnO | 0.02 | 0.02 | 0.01 | 0.01 |
| SrO | 0.60 | 0.55 | 0.50 | 0.44 |
| $Mn_2O_3$ | 0.04 | 0.04 | 0.04 | 0.03 |
| BaO | 1.75 | 1.49 | 1.12 | 0.92 |

Summary of Results

The scanning electron microscope images of the various samples taken with the mineralogical and chemical information obtained from X-ray analysis clearly indicate that samples A and B were considerably more uniform in size and composition than the other samples. While the mineral content of the samples were similar, the average particle size (APS) of samples A and B were less than Samples C and D. Almost no quartz was observed in samples A and B and the glass content appeared to be decreased. Also, calcite was observed in samples A, B and C.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of producing a mineral filler from fly ash in a dry process comprising the steps of:
   providing a quantity of raw fly ash having a carbon content of not more than 1%; and
   passing said fly ash through an air classifier to obtain from about 0.1% to about 60% by weight of a fine fraction having an average particle size of from about 0.1 to about 5 microns.

2. The method of claim 1 further including the step of passing said fine fraction through a magnetic separator to remove ferrous iron oxide from said fine fraction.

3. The method of claim 1 further including the step of treating said fine fraction with a surface modifier.

4. The method of claim 3 wherein said surface modifier is selected from the group consisting of silanes, stearates, aluminates, titanates, and zirconates.

5. The method of claim 4 wherein said surface modifier comprises a vinyl-amino methoxyl silane.

6. The method of claim 4 wherein said surface modifier comprises calcium stearate.

7. The method of claim 4 wherein said surface modifier comprises amino titanate.

8. The method of claim 3 wherein said surface modifier is applied at a dry coating weight of between about 0.1–5% by weight.

9. The method of claim 1 in which said mineral filler comprises from about 5–60% by weight aluminum oxide, from about 0.5–60% by weight calcium oxide, from about 5–30% by weight silicon oxide, from about 0.5–15% by weight magnesium oxide and from about 0.1–10% by weight titanium dioxide.

10. A mineral filler comprising:
    dry processed fly ash comprising from about 5–60% by weight aluminum oxide, from about 0.5–60% by weight calcium oxide, from about 5–30% by weight silicon oxide, from about 0.5–15% by weight magnesium oxide and from about 0.1–10% by weight titanium dioxide.

11. The mineral filler of claim 10 having an average particle size of from about 0.1 to 5 microns.

12. The mineral filler of claim 10 wherein said fly ash has been treated with a surface modifier.

13. The mineral filler of claim 12 wherein said surface modifier is selected from the group consisting of silanes, stearates, aluminates, titanates, and zirconates.

14. The mineral filler of claim 13 wherein said surface modifier is a vinyl-amino methyl siloxane.

15. The mineral filler of claim 13 wherein said surface modifier is calcium stearate.

16. The mineral filler of claim 13 wherein said surface modifier is amino titanate.

* * * * *